(12) United States Patent
Kim et al.

(10) Patent No.: US 10,142,075 B2
(45) Date of Patent: Nov. 27, 2018

(54) METHOD AND APPARATUS FOR TRANSMITTING REFERENCE SIGNAL IN WIRELESS COMMUNICATION SYSTEM BASED ON MULTIPLE ANTENNAS

(71) Applicant: LG ELECTRONICS INC., Seoul (KR)

(72) Inventors: Hyungtae Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 14/929,802

(22) Filed: Nov. 2, 2015

(65) Prior Publication Data

US 2016/0127102 A1    May 5, 2016

Related U.S. Application Data

(60) Provisional application No. 62/074,557, filed on Nov. 3, 2014.

(51) Int. Cl.
*H04L 5/00* (2006.01)

(52) U.S. Cl.
CPC .......... *H04L 5/0051* (2013.01); *H04L 5/0026* (2013.01); *H04L 5/0035* (2013.01)

(58) Field of Classification Search
CPC .... H04L 5/0051; H04L 5/0026; H04L 5/0035
See application file for complete search history.

(56) References Cited

U.S. PATENT DOCUMENTS

| | | | | |
|---|---|---|---|---|
| 8,693,971 B1* | 4/2014 | Balraj | ................. | H04B 7/0417 375/216 |
| 9,065,527 B2* | 6/2015 | Hoshino | ................ | H04B 7/155 |
| 9,769,813 B2* | 9/2017 | Kim | .................... | H04W 72/042 |
| 2012/0300728 A1* | 11/2012 | Lee, II | ..................... | H04J 13/16 370/329 |
| 2014/0071934 A1* | 3/2014 | Frenne | .................... | H04L 5/001 370/330 |

* cited by examiner

*Primary Examiner* — Benjamin H Elliott, IV
*Assistant Examiner* — Brian P Cox
(74) *Attorney, Agent, or Firm* — Dentons US LLP

(57) ABSTRACT

Disclosed is a method of mapping a demodulation-reference signal (DM-RS) transmitted to a terminal by a base station in a wireless communication system based on multiple antennas. Specifically, the method includes grouping a plurality of DM-RS ports into antenna port groups including a predefined number of DM-RS ports, mapping a DM-RS sequence to two symbol resources of a first slot and two symbol resources of a second slot on one subcarrier, and transmitting the mapped DM-RS sequence to the terminal through the plurality of DM-RS ports, wherein a DM-RS sequence transmitted through DM-RS ports included in the same antenna port group is mapped by applying an orthogonal cover code (OCC) having a length of 2 to the same symbol resource, and the two symbol resources of the first slot correspond to a first antenna port group and the two symbol resources of the second slot correspond to a second antenna port group on the one subcarrier.

4 Claims, 15 Drawing Sheets

(A) CONTROL-PLANE PROTOCOL STACK (B) USER-PLANE PROTOCOL STACK

METHOD AND APPARATUS FOR TRANSMITTING REFERENCE SIGNAL IN WIRELESS COMMUNICATION SYSTEM BASED ON MULTIPLE ANTENNAS

This application claims the benefit of U.S. Provisional Application No. 62/074,557, filed on Nov. 3, 2014, which is hereby incorporated by reference as if fully set forth herein.

BACKGROUND OF THE INVENTION

Field of the Invention

The present invention relates to a wireless communication system, and more particularly, to a method and apparatus for transmitting a reference signal in a wireless communication system based on multiple antennas.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to a method and apparatus for transmitting a reference signal in a wireless communication system based on multiple antennas that substantially obviates one or more problems due to limitations and disadvantages of the related art.

To achieve these objects and other advantages and in accordance with the purpose of the invention, as embodied and broadly described herein, a method of transmitting a demodulation-reference signal (DM-RS) to a terminal by a base station in a wireless communication system based on multiple antennas includes grouping a plurality of DM-RS ports into antenna port groups including a predefined number of DM-RS ports, mapping a DM-RS sequence to two symbol resources of a first slot and two symbol resources of a second slot resources on one subcarrier, and transmitting the mapped DM-RS sequence to the terminal through the plurality of DM-RS ports, wherein a DM-RS sequence transmitted through DM-RS ports included in the same antenna port group is mapped to the same symbol resource by applying an orthogonal cover code (OCC) having a length of 2, and wherein the two symbol resources of the first slot correspond to a first antenna port group and the two symbol resources of the second slot correspond to a second antenna port group on the one subcarrier.

In addition, the method may further include mapping the DM-RS sequence to two symbol resources of the first slot and two symbol resources of the second slot on another subcarrier adjacent to the one subcarrier. In this case, the two symbol resources of the first slot may correspond to a third antenna port group on the other subcarrier, and the two symbol resources of the second slot may correspond to a fourth antenna port group on the other subcarrier.

Additionally, the transmitting may include applying the same precoder to the mapped DM-RS sequence in a unit of one or more resource blocks.

In another aspect of the present invention, a transmitter in a wireless communication system includes a wireless communication module for exchanging a signal with a receiver, and a processor for processing the signal, wherein the processor controls the wireless communication module to group a plurality of DM-RS ports into antenna port groups including a predefined number of DM-RS ports, map a DM-RS sequence to two symbol resources of a first slot and two symbol resources of a second slot on one subcarrier, and transmit the mapped DM-RS sequence to the receiver through the plurality of DM-RS ports, wherein the processor maps a DM-RS sequence transmitted through DM-RS ports included in the same antenna port group by applying an OCC having a length of 2 to the same symbol resource, and the two symbol resources of the first slot correspond to a first antenna port group and the two symbol resources of the second slot correspond to a second antenna port group on the one subcarrier.

In addition, the processor may map the DM-RS sequence to two symbol resources of the first slot and two symbol resources of the second slot on another subcarrier adjacent to the one subcarrier, wherein the two symbol resources of the first slot may correspond to a third antenna port group on the other subcarrier, and the two symbol resources of the second slot may correspond to a fourth antenna port group on the other subcarrier.

Additionally, the processor may apply the same precoder to the mapped DM-RS sequence in a unit of one or more resource blocks.

In the above embodiment, DM-RS sequences transmitted through DM-RS ports of each of the antenna port groups may be generated based on the same scrambling identifier when the predefined number is 2. Further, a DM-RS sequence transmitted through two DM-RS ports of each of the antenna port groups and a DM-RS sequence transmitted through the other two DM-RS ports may be generated based on different scrambling identifiers when the predefined number is 4.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
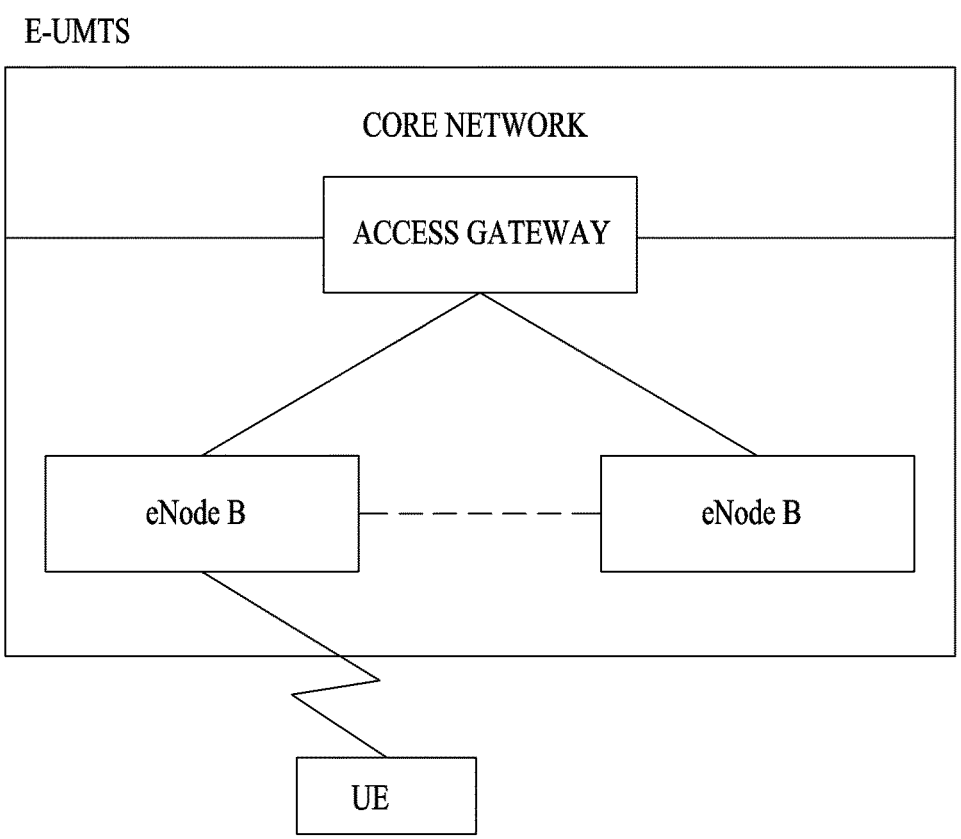
FIG. 1 illustrates a configuration of an Evolved Universal Mobile Telecommunications System (E-UMTS) network as an example of a wireless communication system.
Figure 2:
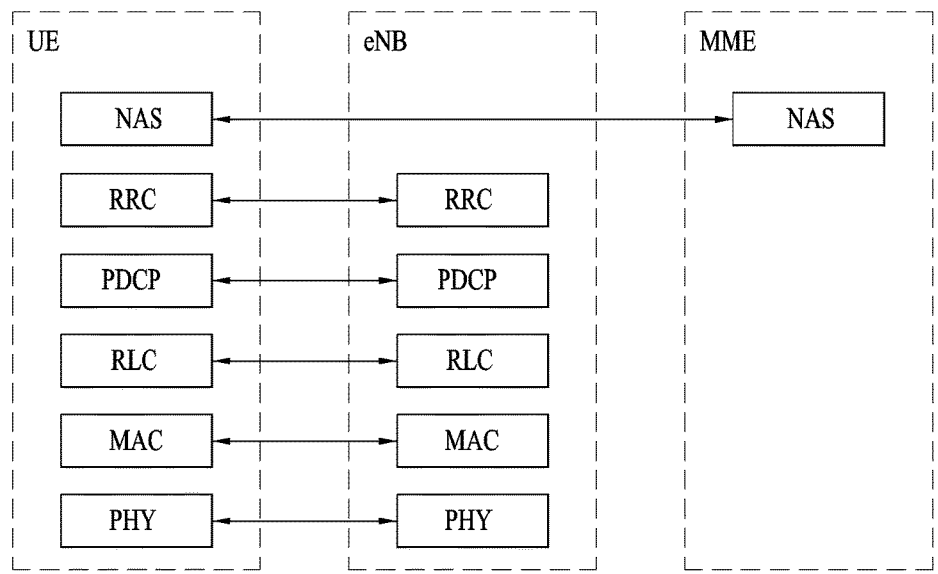
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
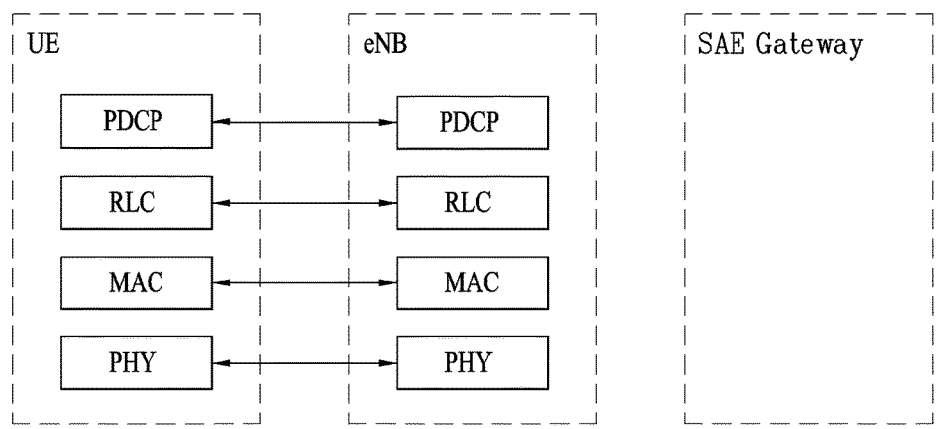

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
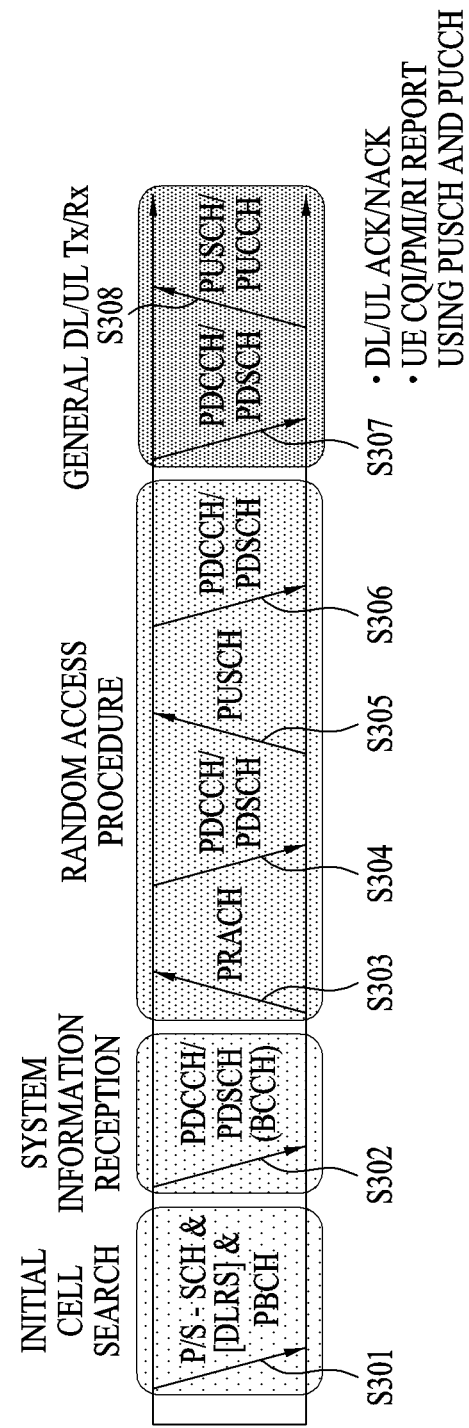
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
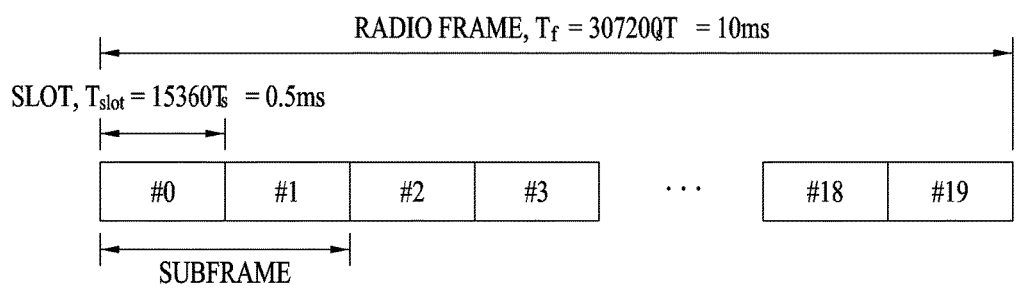
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15\ \text{kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
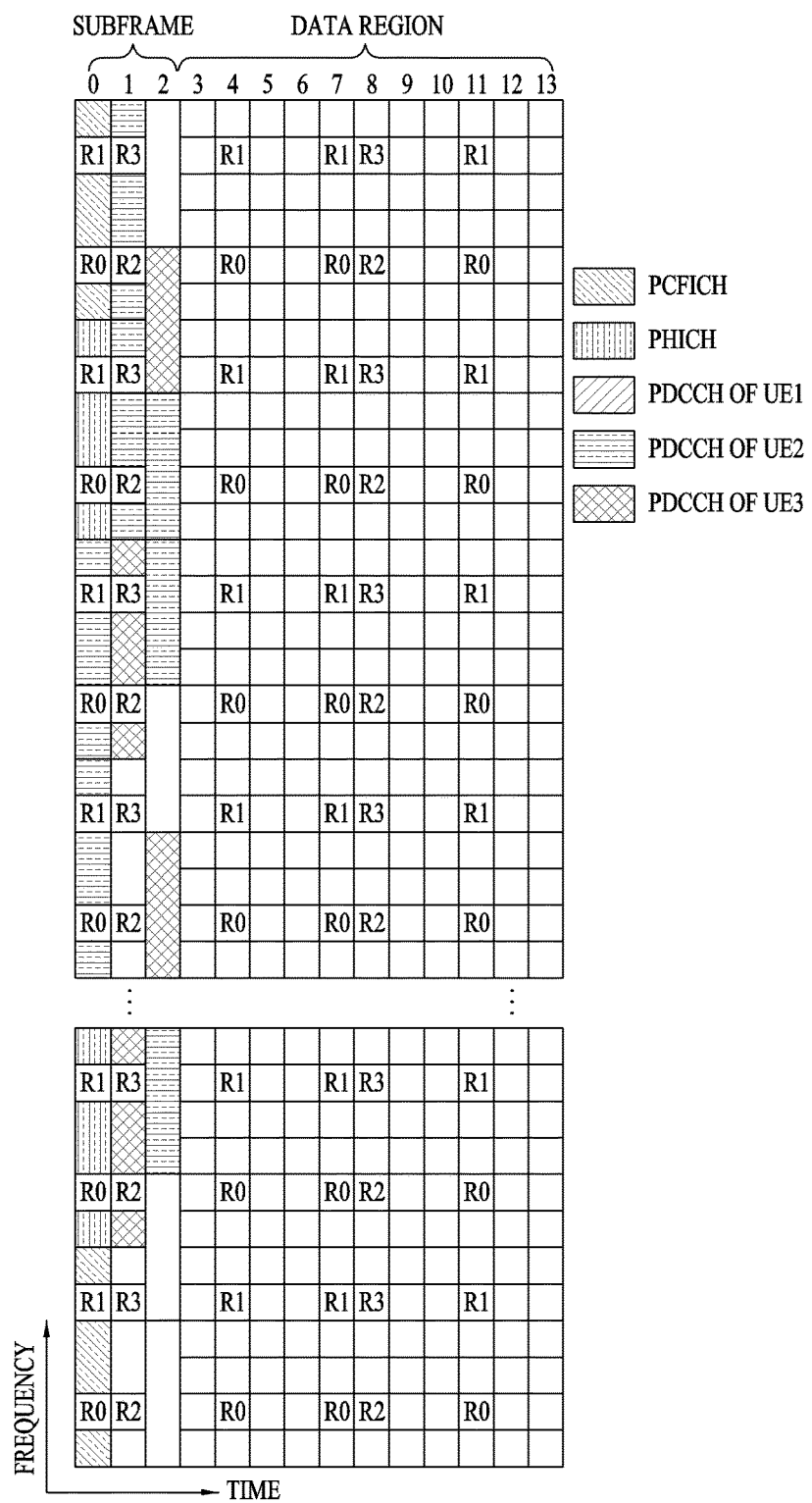
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
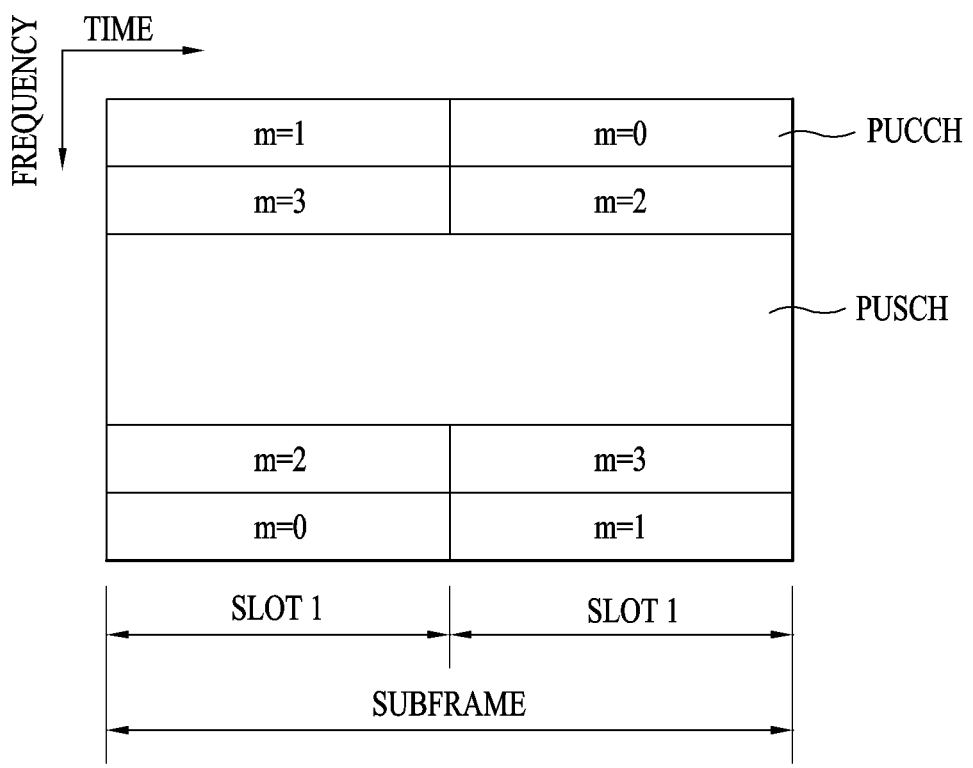
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 7:
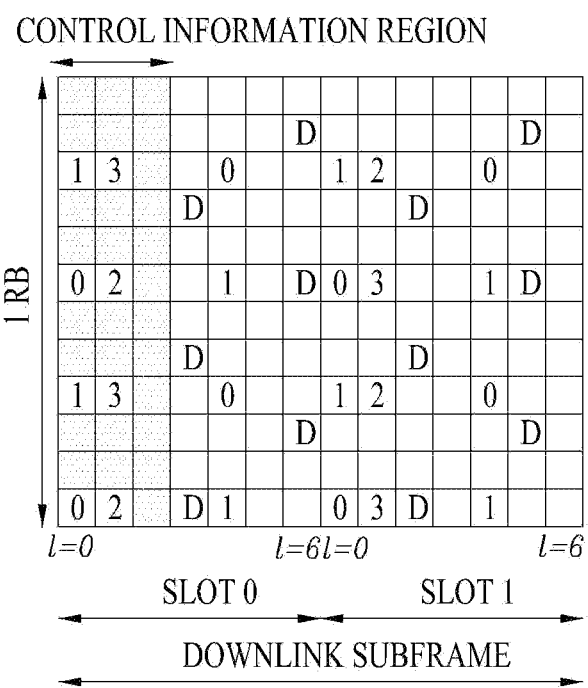
FIGS. 7 and 8 illustrate downlink Reference Signal (RS) configurations in an LTE system supporting downlink transmission through four antennas (4-Tx downlink transmission)
Figure 8:
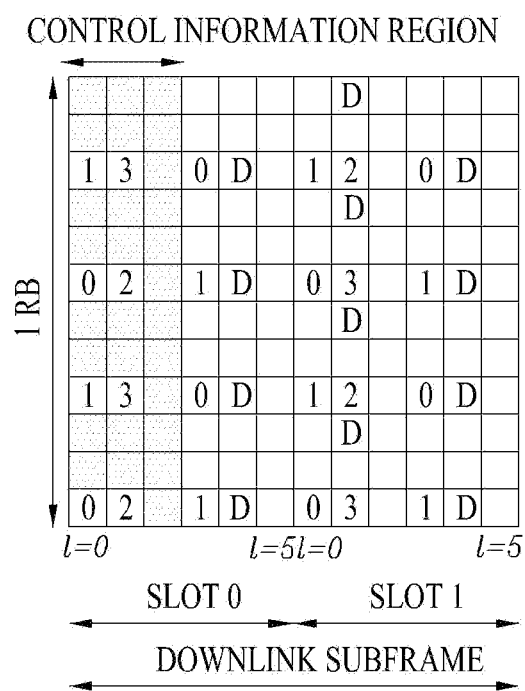

FIGS. 7 and 8 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 7 and 8, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 7 and 8, the DMRSs are transmitted through antenna port 5. 3GPP TS 36.211 defines DMRSs for a total of eight antenna ports, antenna port 7 to antenna port 14.

Figure 9:
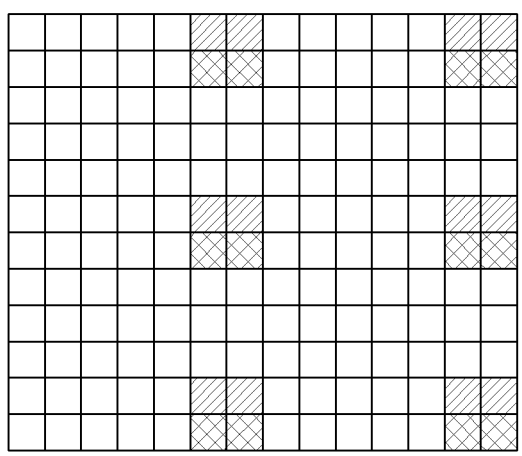
FIG. 9 illustrates an exemplary downlink Demodulation Reference Signal (DM-RS) allocation defined in a current 3GPP standard specification.

FIG. 9 illustrates an example of allocating a downlink DM-RS defined in a current 3GPP LTE system. In particular, FIG. 9 illustrates REs occupied by a DM-RS among REs in one RB pair of a normal downlink subframe having a normal CP.

A DM-RS is supported for transmission of a PDSCH, and corresponds to an antenna port p=5, p=7, p=8 or p=7, 8, . . . , D+6 (here, v denotes the number of layers used for transmission of the PDSCH). The DM-RS is present when transmission of the PDSCH is related with a corresponding antenna port, and is a valid reference only for demodulation of the PDSCH. The DM-RS is transmitted only on RBs to which the PDSCH is mapped.

In other words, the DM-RS is configured to be transmitted only on the RBs to which the PDSCH is mapped in a subframe in which the PDSCH is scheduled unlike a CRS which is configured to be transmitted in every subframe irrespective of the presence/absence of the PDSCH. In addition, the DM-RS is transmitted only through antenna port(s) corresponding to respective layer(s) of the PDSCH unlike the CRS which is transmitted through all antenna port(s) irrespective of the number of layers of the PDSCH. Therefore, overhead of the RS may be reduced when compared to the CRS.

In the 3GPP LTE-A system, the DM-RS is defined in a PRB pair. Referring to FIG. 9, for p=7, p=8 or p=7, 8, . . . , v+6, a DM-RS sequence r(m) is mapped to complex modulation symbols $a_{k,l}^{(p)}$ according to Equation 1 below in a PRB having a frequency-domain index $n_{PRB}$ assigned for transmission of the PDSCH.

$$a_{k,l}^{(p)} = w_p(l') \cdot r(3 \cdot l' \cdot N_{RB}^{max,DL} + 3 \cdot n_{PRB} + m') \qquad \text{[Equation 1]}$$

Here, $w_p(i)$, l', and m' are given by the following Equation 2.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \qquad \text{[Equation 2]}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l =$$

-continued $$\begin{cases} l' \bmod 2 + 2 & \text{if in a special } subframe with \text{ configuration 3, 4, or 8} \\ l' \bmod 2 + 2 + 3\lfloor l'/2 \rfloor & \text{if in a special } subframe with \text{ configuration 1, 2, 6, or 7} \\ l' \bmod 2 + 5 & \text{if not in a special } subframe \end{cases}$$

$$l' = \begin{cases} 0, 1, 2, 3 & \text{if } n_s \bmod 2 = 0 \text{ and in } a \ special subframe with \text{ configuration 1, 2, 6, or 7} \\ 0, 1 & \text{if } n_s \bmod 2 = 0 \text{ and not in } special subframe with \text{ configuration 1, 2, 6, or 7} \\ 2, 3 & \text{if } n_s \bmod 2 = 1 \text{ and not in } special subframe with \text{ configuration 1, 2, 6, or 7} \end{cases}$$

$$m' = 0, 1, 2$$

Here, a sequence $\overline{w}_p(i)$, having a length of 4 for the normal CP, that is, an orthogonal cover code (OCC) is given as Table 1 below according to an antenna port index.

TABLE 1

| Antenna port p | $[\overline{w}_p(0) \ \overline{w}_p(1) \ \overline{w}_p(2) \ \overline{w}_p(3)]$ |
|---|---|
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In addition, for an antenna port p∈{7, 8, . . . , v+6}, the DM-RS sequence r(m) is defined as the following Equation 3.

$$r(m) = \qquad \text{[Equation 3]}$$
$$\frac{1}{\sqrt{2}}(1 - 2 \cdot c(2m)) + j\frac{1}{\sqrt{2}}(1 - 2 \cdot c(2m+1)),$$
$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 3, c(i) is a pseudo-random sequence, and is defined by a length-31 Gold sequence. An output sequence c(n) having a length of $M_{PN}$ (here, n=0, 1, . . . , $M_{PN}$−1) is defined by the following Equation 4.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \qquad \text{[Equation 4]}$$

In the above Equation 4, $N_c$=1600, a first m-sequence is initialized to $x_1(0)$=1, $x_1(n)$=0, n=1, 2, . . . , 30, and a second m-sequence is denoted by $c_{init} = \sum_{i=0}^{30} x_2(i) \cdot 2^i$ which has a value according to application of the above sequence. In Equation 4, a pseudo-random sequence for generation of c(i) is initialized to $c_{init}$ according to Equation 5 below at a start of each subframe.

$$c_{init} = (\lfloor ns/2 \rfloor + 1) \cdot (2N_{ID}^{cell} + 1) \cdot 2^{16} + n_{SCID} \qquad \text{[Equation 5]}$$

In the above Equation 5, $n_{SCID}$ has a value of 0 unless otherwise specified, and is given by a DCI format 2B or 2C related to transmission of the PDSCH for transmission of the PDSCH on antenna port 7 or 8. DCI format 2B is a DCI format for a PDSCH which uses a maximum of two antenna ports having DM-RSs, and DCI format 2C is a DCI format for a PDSCH which uses a maximum of eight antenna ports having DM-RSs.

According to a current LTE standard, large delay (LD) cyclic delay diversity (CDD), which is an open-loop MIMO transmission scheme for a high-speed UE, is designed to be subjected to spatial multiplexing (SM) up to a maximum of four layers. However, in a massive transmit antenna environment in which the number of base station antennas increases to 16 or more, more spatial resources are provided, and thus SM gain that can be transmitted to one UE increases. In other words, there is a need to redesign LD CDD of five layers or more.

In order to support LD CDD subjected to SM to five layers or more, five or more RS ports need to be present. However, a maximum number of antenna ports of a CRS is restricted to 4 in current CRS-based LD CDD, and thus there is difficulty in considering increase in layers of LD CDD. Therefore, it is possible to consider a DM-RS-based LD CDD scheme using a DM-RS, which is present in up to a maximum of eight antenna ports, instead of a CRS. When more DM-RS ports are needed to support the DM-RS-based LD CDD scheme, the number of DM-RS ports needs to be increased to 9 or more.

In the DM-RS-based LD CDD scheme according to the present invention, it is preferable to fix an nSCID to one value. For example, the nSCID may be fixed to 0 at all times and used since multi-user (MU)-MIMO is not considered in LD CDD and thus the nSCID is preferably fixed to one value while one value may be dynamically selected as the nSCID from two values of 0 and 1 to perform MU-MIMO transmission in DM-RS-based PDSCH transmission. In addition, a virtual cell ID (VCID) of a DM-RS introduced for Coordinated Multi-Point (CoMP) transmission is unnecessary in the DM-RS-based LD CDD scheme, and thus the VCID may be restricted to a physical cell ID (PCID) and used.

In general, a transmitted signal Y(i) may be expressed by W·D(i)·U·x(i) in LD CDD. Here, W denotes a precoder which is a (the number of transmit antennas)×(layer) matrix, and D(i) is a diagonal matrix corresponding to (layer)× (layer) in which diagonal elements are defined as $\{1, e^{-j2\pi i/v}, e^{-j4\pi i/v}, e^{-j6\pi i/v}, \ldots, e^{-j(v-1)\pi i/v}\}$. U denotes a DFT matrix corresponding to (layer)×(layer), x denotes a data symbol corresponding to layer×1, v denotes the number of layers, and i denotes an ith modulation symbol per antenna port.

The transmitted signal Y(i) may be more simply expressed by W·x'(i) (wherein x'=D(i)·U·x(i)). Here, a kth row of x'(i) may be defined as a kth virtual layer, and an effective channel, on which the kth virtual layer is transmitted, is estimated from a (k+6)th DM-RS port. In other words, when a base station transmits a DM-RS sequence by performing precoding using a kth vector of W, a UE recognizes the DM-RS sequence as the (k+6)th DM-RS port, and estimates an effective channel subjected to precoding by a kth vector of W and channel H using the (k+6)th DM-RS port.

In conventional DM-RS-based transmission, an equation Y(i)=W·x(i) is satisfied, and thus an actual layer in which a data symbol is transmitted is matched with a DM-RS port on a one-to-one basis. However, in LD CDD, W and x(i) are multiplied by D(i)U, and thus 1:1 matching between the actual layer and the DM-RS port is not applied. Instead, 1:1 matching between a virtual layer and the DM-RS port is applied. A mapping relation of D(i)·U is present between the virtual layer and the actual layer.

The present invention proposes a DM-RS pattern based on an OCC having a length of 2 to apply the above-described DM-RS-based LD CDD scheme.

Figure 10:
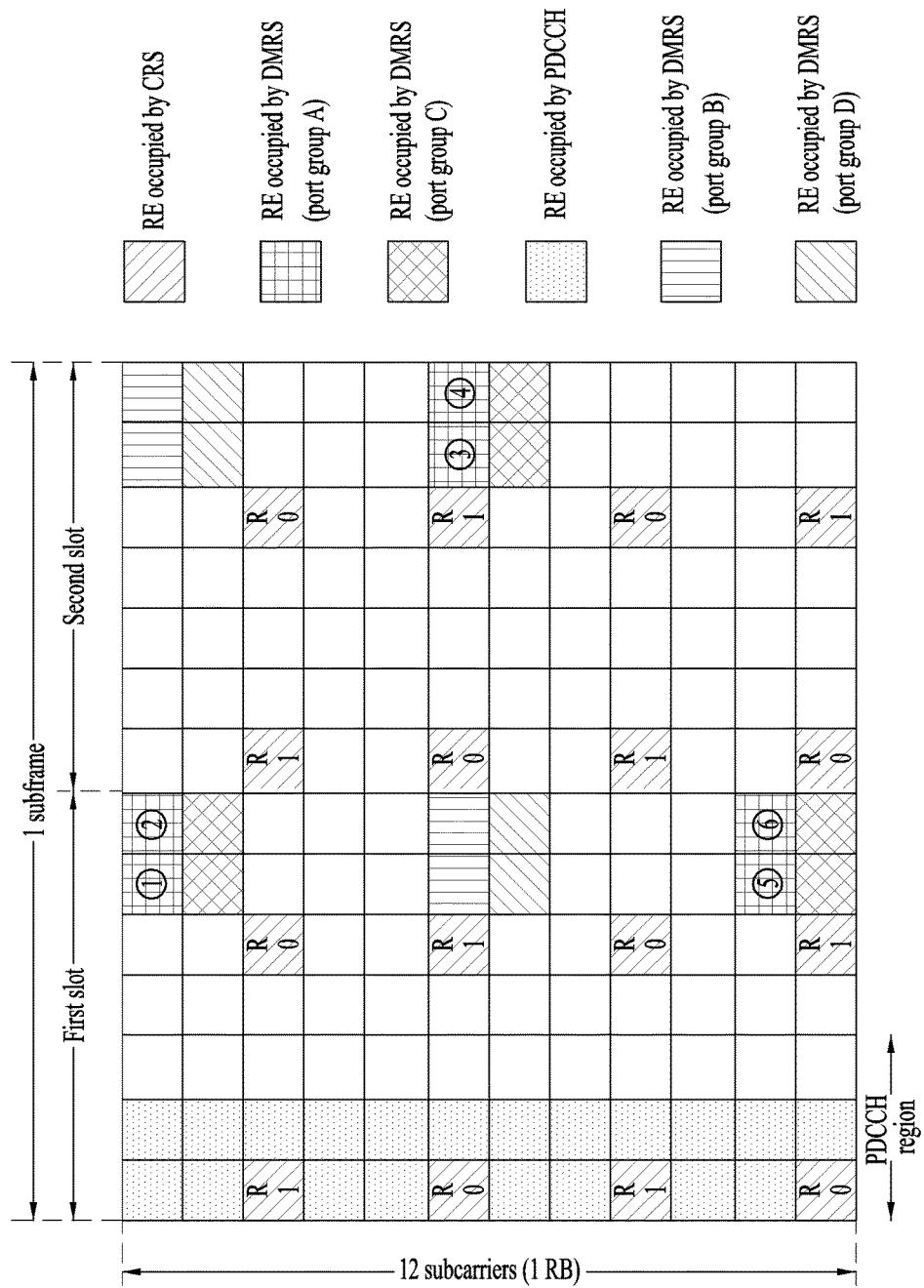
FIG. 10 illustrates a DM-RS mapping pattern which has an OCC having a length of 2 according to an embodiment of the present invention.

FIG. 10 illustrates a DM-RS mapping pattern which has an OCC having a length of 2 according to an embodiment of the present invention.

Referring to FIG. 10, it can be understood that two DM-RS ports included in each DM-RS port group are code division multiplexed (CDM) using an OCC having a length of 2. For example, in DM-RS port group A, DM-RS port 7 and DM-RS port 8 are transmitted and code division multiplexed using an OCC ([1 1], [1 −1]) having a length of 2.

Specifically, after a DM-RS sequence is generated, antenna port 7 is transmitted by applying OCC [1 1] to ① and ②, OCC [1 1] to ③ and ④, and OCC [1 1] to ⑤ and ⑥ using two REs as a unit with respect to six REs of DM-RS port group A. In addition, antenna port 8 is transmitted by applying OCC [1 −1] to ① and ②, OCC [1 −1] to ③ and ④, and OCC [1 −1] to ⑤ and ⑥.

In other words, transmission is performed by applying an OCC having a length of 2 to REs corresponding to two contiguous symbols on one subcarrier. An OCC having a length of 2 is applied to remaining port groups in a similar manner. An antenna port is mapped to an antenna port group using Table 2.

TABLE 2

| Group index | Antenna port group | | | |
|---|---|---|---|---|
| | A | B | C | D |
| DM-RS port | 7, 8 | 9, 10 | 11, 12 | 13, 14 |

When a DM-RS is configured as in FIG. 10, RE density per antenna port may be reduced by half when compared to an existing DM-RS, and thus channel estimation performance may be degraded. To decrease this performance degradation, it is possible to consider designing a DM-RS as in FIG. 11.

Figure 11:
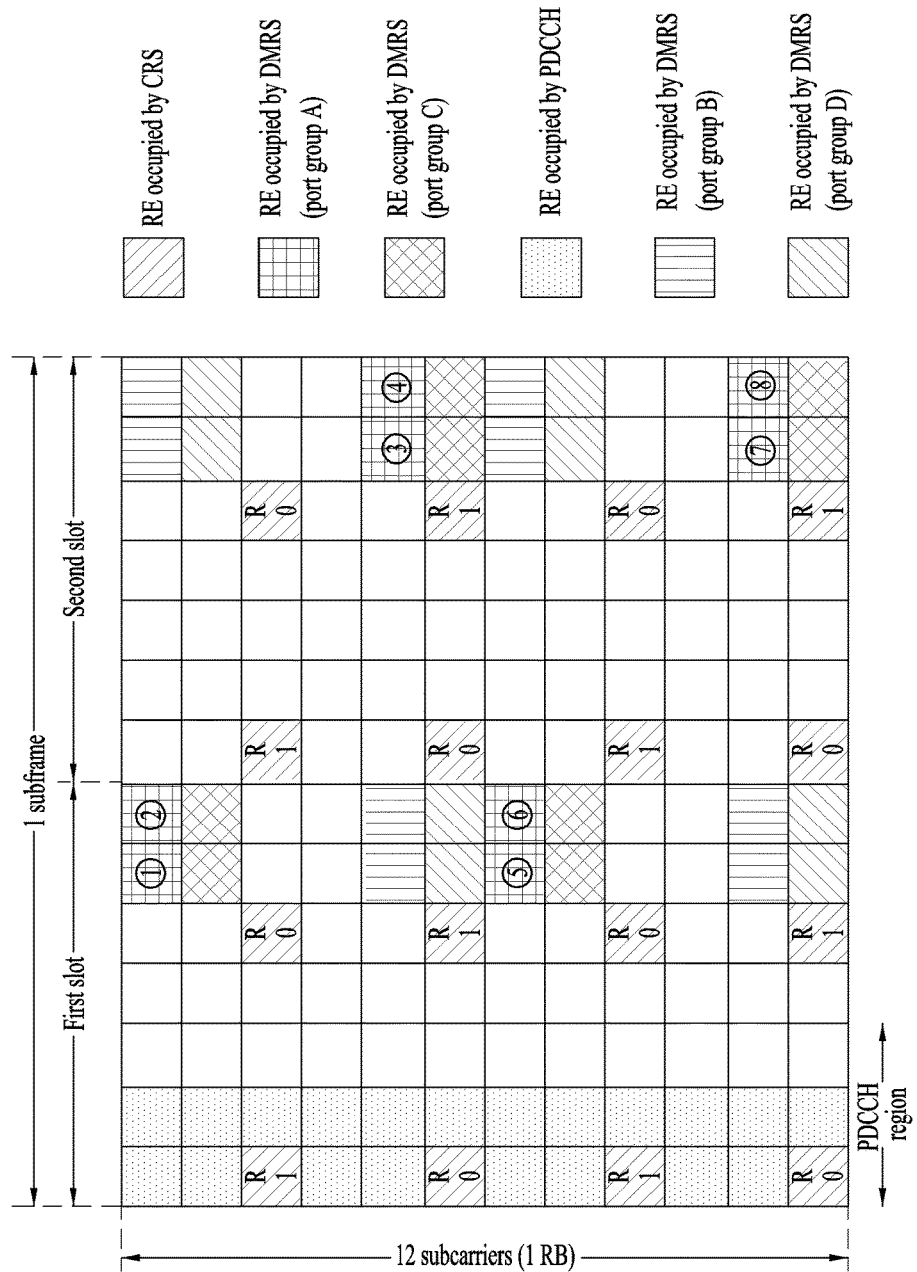
FIG. 11 illustrates another example of a DM-RS mapping pattern which has an OCC having a length of 2 according to an embodiment of the present invention.

FIG. 11 illustrates another example of a DM-RS port which has an OCC having a length of 2 according to an embodiment of the present invention.

Referring to FIG. 11, in each DM-RS port group, two DM-RS ports are code division multiplexed using an OCC having a length of 2. For example, in DM-RS port group A, DM-RS port 7 and antenna port 8 are transmitted and code division multiplexed using an OCC ([1 1], [1 −1]) having a length of 2.

Specifically, after a DM-RS sequence is generated, antenna port 7 is transmitted by applying OCC [1 1] to ① and ②, OCC [1 1] to ③ and ④, OCC [1 1] to ⑤ and ⑥, and OCC [1 1] to ⑦ and ⑧ using two REs as a unit with respect to eight REs of DM-RS port group A. In addition, antenna port 8 of DM-RS port group A is transmitted by applying OCC [1 −1] to ① and ②, OCC [1 −1] to ③ and ④, OCC [1 −1] to ⑤ and ⑥, and OCC [1 −1] to ⑦ and ⑧.

In other words, transmission is performed by applying an OCC having a length of 2 to REs corresponding to two contiguous symbols on one subcarrier. An OCC having a length of 2 is applied to remaining port groups in a similar manner. An antenna port is mapped to an antenna port group using the above Table 2.

Meanwhile, referring to FIG. 11, as a result of increase in DM-RS overhead, the number REs used for PDSCH transmission decreases. It is possible to consider performing LD CDD transmission after PRB bundling for every two PRB pairs to improve performance while maintaining DM-RS overhead of FIG. 10.

Figure 12:
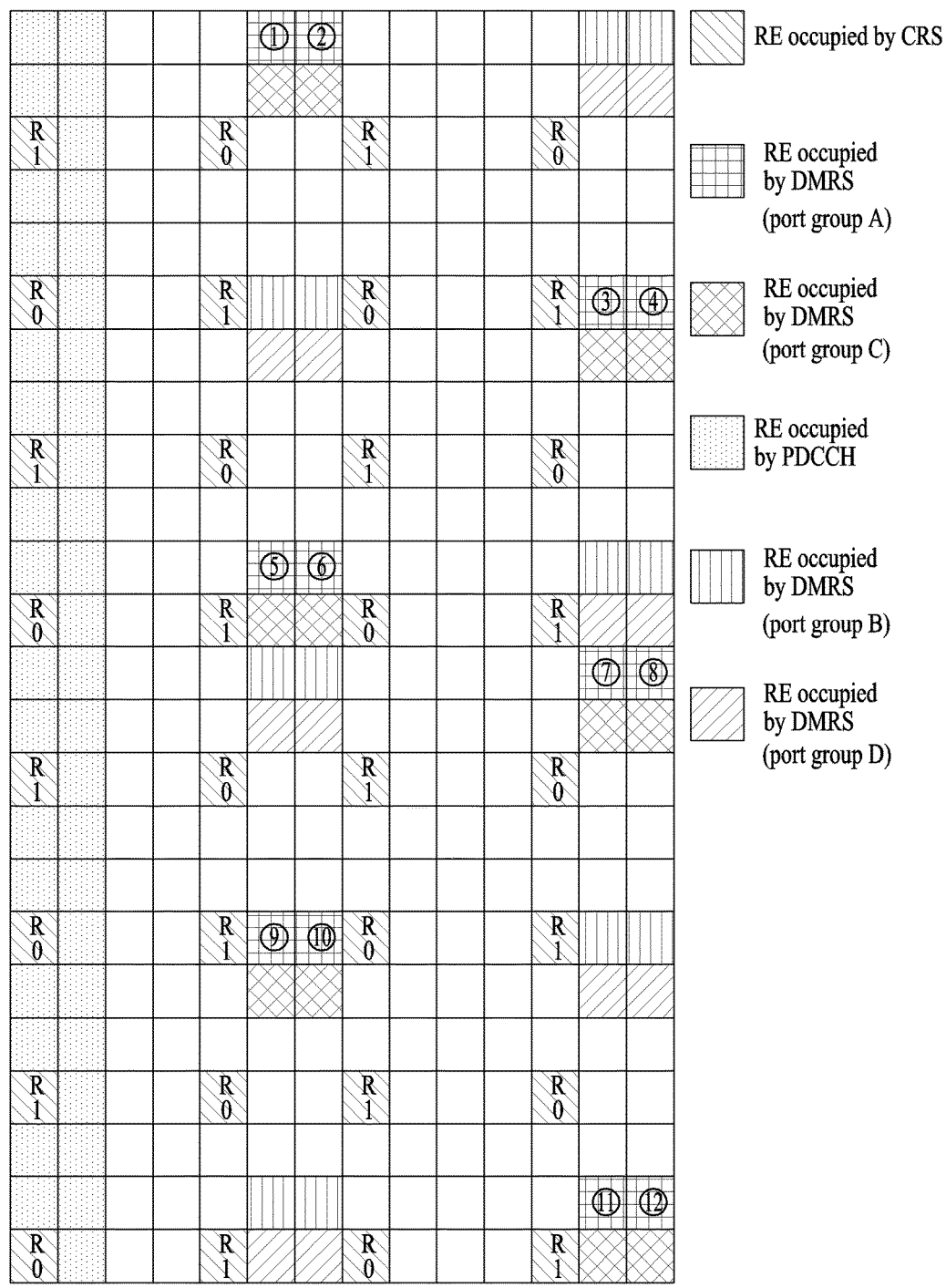
FIG. 12 illustrates an example of a DM-RS mapping pattern which has an OCC having a length of 2 when PRB bundling is applied according to an embodiment of the present invention.

FIG. 12 illustrates an example of a DM-RS mapping pattern which has an OCC having a length of 2 when PRB bundling is applied according to an embodiment of the present invention.

Referring to FIG. 12, in each DM-RS port group, two DM-RS ports are code division multiplexed using an OCC having a length of 2. For example, in DM-RS port group A, DM-RS port 7 and antenna port 8 are code division multiplexed using an OCC ([1 1], [1 −1]) having a length of 2.

In other words, after a DM-RS sequence is generated, antenna port 7 is transmitted by applying OCC [1 1] to ① and ②, OCC [1 1] to ③ and ④, OCC [1 1] to ⑤ and ⑥, OCC [1 1] to ⑦ and ⑧, OCC [1 1] to ⑨ and ⑩, and OCC [1 1] to ⑪ and ⑫ using two REs as a unit with respect to twelve REs of DM-RS port group A. In addition, antenna port 8 of DM-RS port group A is transmitted by applying OCC [1 −1] to ① and ②, OCC [1 −1] to ③ and ④, OCC [1 −1] to ⑤ and ⑥, OCC [1 −1] to ⑦ and ⑧, OCC [1 −1] to ⑨ and ⑩, and OCC [1 −1] to ⑪ and ⑫.

In other words, transmission is performed by applying an OCC having a length of 2 to REs corresponding to two contiguous symbols on one subcarrier. An OCC having a length of 2 is applied to remaining DM-RS port groups in a similar manner. An antenna port is mapped to an antenna port group using the above Table 1.

However, the same precoder W needs to be applied to two PRB pairs of FIG. 12, and the UE improves channel estimation performance using the fact that bundling is applied to the two PRB pairs. DM-RS-based LD CDD transmission restrictively uses at least two PRB pairs for channel estimation performance.

The DM-RS mapping pattern which applies an OCC having a length of 2 by performing bundling for every two PRB pairs is proposed in FIG. 12. However, bundling may be extensively performed for each of more than two PRB pairs. For example, the same precoder W may be configured for each of three PRB pairs, and a third PRB pair may be added to FIG. 12 to configure a DM-RS mapping pattern. The same DM-RS mapping pattern as that of a first PRB pair may be applied to the third added PRB pair.

Figure 13:
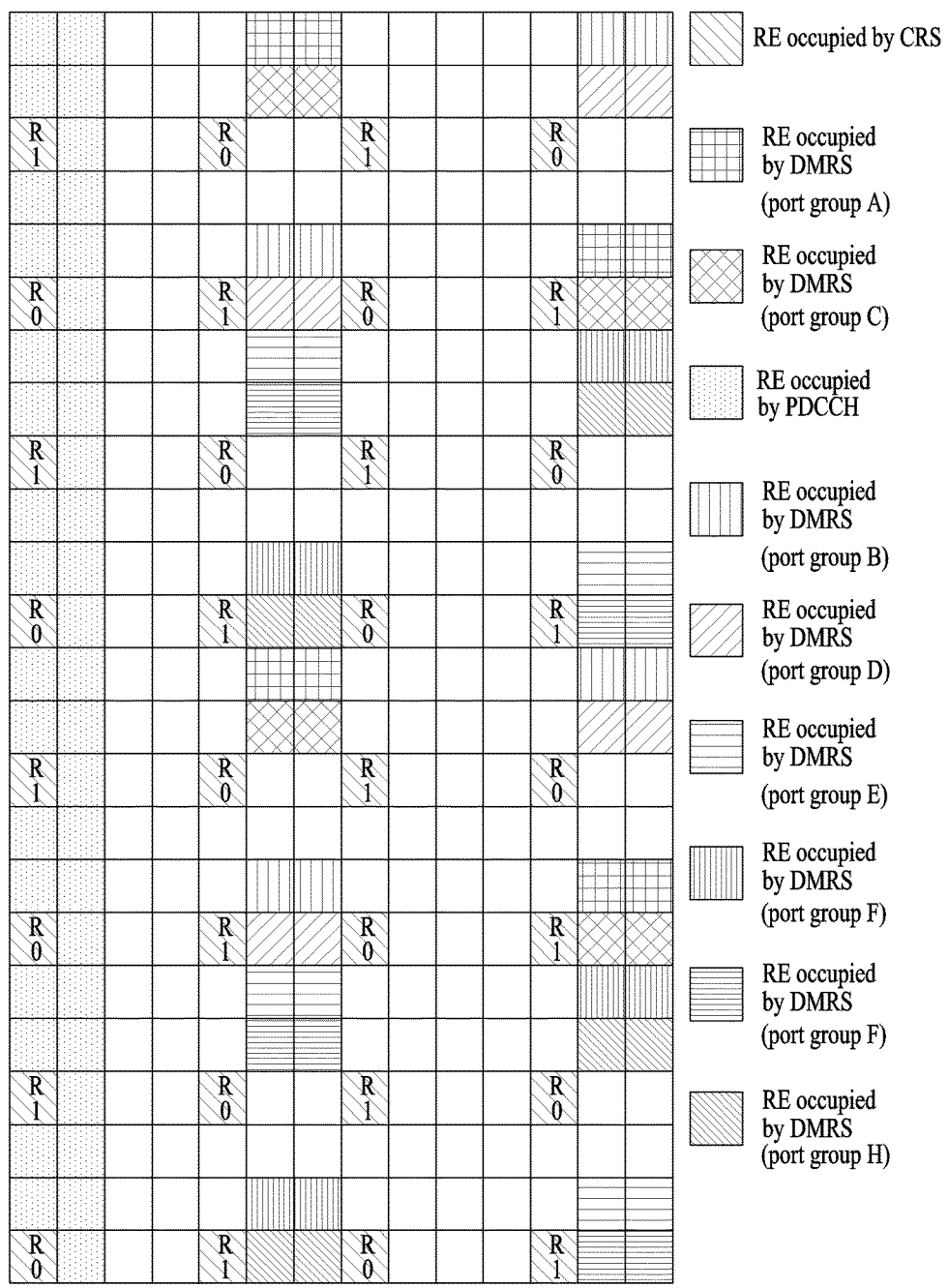
FIG. 13 illustrates another example of a DM-RS mapping pattern which has an OCC having a length of 2 when PRB bundling is applied according to an embodiment of the present invention.

Additionally, the DM-RS mapping pattern illustrated in FIG. 11 may be extended to two PRB pairs to design a 16-port DM-RS. FIG. 13 illustrates another example of a DM-RS mapping pattern which has an OCC having a length of 2 when PRB bundling is applied according to an embodiment of the present invention.

Similarly, the same precoder W is applied to two PRB pairs to perform PRB bundling, and the UE improves channel estimation performance using bundling at the time of channel estimation. In each port group, transmission is performed by applying an OCC, which has a length of 2, to REs corresponding to two contiguous symbols on one subcarrier. However, an antenna port may be mapped to an antenna port group using Table 3.

TABLE 3

| Group index | Antenna port group | | | | | | | |
|---|---|---|---|---|---|---|---|---|
| | A | B | C | D | E | F | G | H |
| DM-RS port | 7, 8 | 9, 10 | 11, 12 | 13, 14 | 15, 16 | 17, 18 | 19, 20 | 21, 22 |

It is possible to consider a scheme below as another scheme of designing the 16-port DM-RS. First, a different DM-RS sequence from that of existing DM-RS ports 7, 8, . . . , 14 is generated for added DM-RS antenna ports (for example, port indices 15, 16, . . . , 22), and is transmitted together with an existing DM-RS port group (that is, antenna ports 7, 8, . . . , 14) through REs used by the existing DM-RS port group. New DM-RS ports and the existing DM-RS ports use different nSCIDs to generate and use different DM-RS sequences.

In the above example, the new antenna ports and the existing antenna ports use different nSCIDs. However, the present invention is not limited thereto, and may be applied to a scheme of using different DM-RS sequences using different nSCIDs for an arbitrary DM-RS port at the time of single user (SU)-MIMO transmission. For example, even though FIG. 12 supports up to an 8-port DM-RS by applying Table 2, FIG. 12 may be extended to support up to a 16-port DM-RS by applying the above scheme.

In other words, the existing antenna ports 7, 8, . . . , 14 generate a DM-RS sequence using nSCID=0, and the new antenna ports 15, 16, . . . , 22 generate a DM-RS sequence using nSCID=1. The existing antenna ports and the new antenna ports use different DM-RS sequences, and thus fully orthogonal transmission thereof may not be performed by an OCC. However, quasi-orthogonal transmission thereof may be performed. The newly generated antenna ports are mapped to antenna port groups using Table 4 below.

Specifically, antenna ports included in each of a port pair having DM-RS ports 7 and 8 and a port pair having DM-RS ports 15 and 16 in DM-RS port group A are code division multiplexed. As a result, DM-RS antenna ports included in each of the port pairs are orthogonal to each other. However, different DM-RS sequences are used between the two port pairs, and thus the two port pairs are quasi-orthogonal to each other. Therefore, interference may occur between the antenna ports. However, it is possible to increase DM-RS ports without increase in overhead using this scheme.

TABLE 4

| | Antenna port group | | | |
|---|---|---|---|---|
| Group index | A | B | C | D |
| DM-RS port | 7, 8, 15, 16 | 9, 10, 17, 18 | 11, 12, 19, 20 | 13, 14, 21, 22 |

Figure 14:
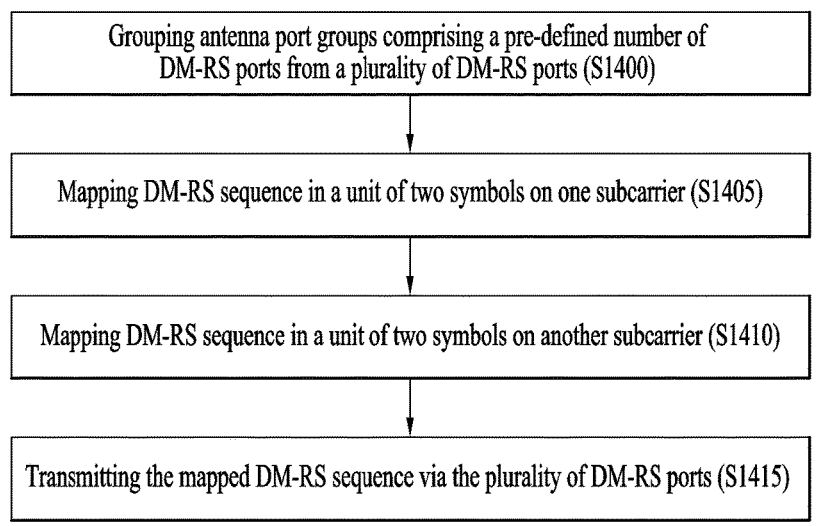
FIG. 14 is a flowchart illustrating that a base station transmits a DM-RS to a terminal according to an embodiment of the present invention.

FIG. 14 is a flowchart illustrating that a base station transmits a DM-RS to a terminal according to an embodiment of the present invention. In particular, even though FIG. 14 employs the DM-RS mapping pattern which has an OCC having a length of 2 illustrated in FIG. 10, it is clear that FIG. 14 may be applied to the DM-RS mapping pattern illustrated in FIGS. 11 to 13.

Referring to FIG. 14, in S1400, first, a plurality of DM-RS ports are grouped into antenna port groups including a predefined number of DM-RS ports. Specifically, antenna port groups are defined as in Table 2 for DM-RS ports 7 to 14.

Thereafter, the base station generates a DM-RS sequence and maps the DM-RS sequence for every two contiguous symbol resources on one subcarrier in S1405. In addition, in S1410, the base station maps the DM-RS sequence for every two contiguous symbol resources on another subcarrier adjacent to the one subcarrier.

After mapping the DM-RS sequence based on the DM-RS pattern illustrated in FIG. 10 in S1405 and S1410, the base station transmits the mapped DM-RS sequence to the terminal through the plurality of DM-RS ports in S1415.

In particular, in S1405 and S1410, a DM-RS sequence transmitted through DM-RS ports included in the same antenna port group is mapped by applying an OCC having a length of 2 to the same symbol resource. In other words, the DM-RS sequence is transmitted by applying an OCC having a length of 2 to REs corresponding to two contiguous symbols on one subcarrier, and the DM-RS sequence is transmitted by applying an OCC having a length of 2 in a similar manner for remaining antenna port groups.

More specifically, on one subcarrier, the two symbol resources of a first slot correspond to a first antenna port group, and the two symbol resources of a second slot correspond to a second antenna port group. In addition, on the other subcarrier, the two symbol resources of the first slot correspond to a third antenna port group, and the two symbol resources of the second slot correspond to a fourth antenna port group.

Figure 15:
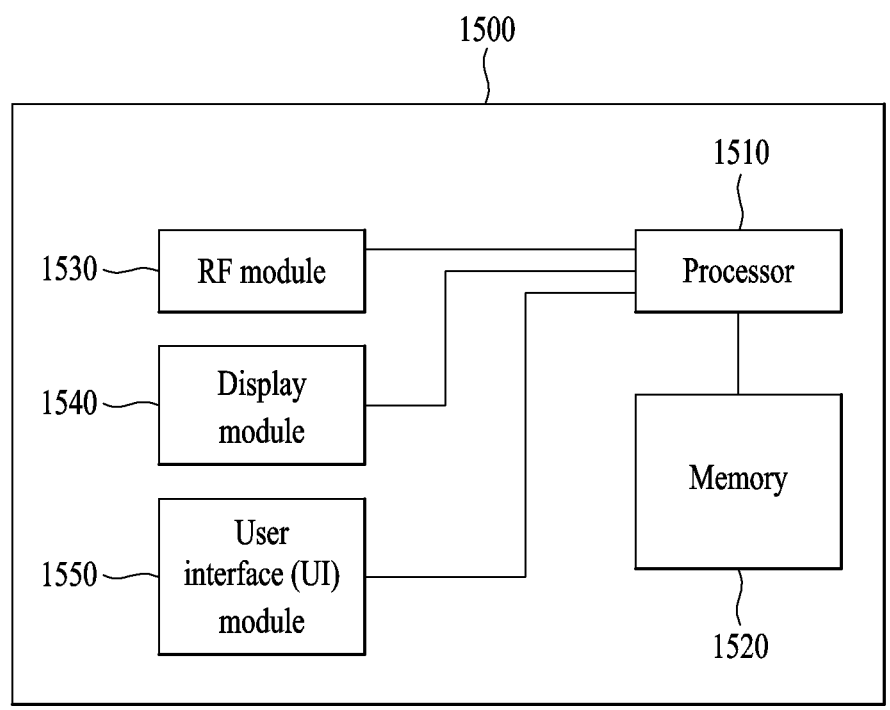
FIG. 15 is a block diagram of a communication apparatus according to an embodiment of the present invention.

FIG. 15 is a block diagram of a communication apparatus according to an embodiment of the present invention.

Referring to FIG. 15, a communication apparatus 1500 includes a processor 1510, a memory 1520, an RF module 1530, a display module 1540, and a User Interface (UI) module 1550.

The communication device 1500 is shown as having the configuration illustrated in FIG. 15, for the convenience of description. Some modules may be added to or omitted from the communication apparatus 1500. In addition, a module of the communication apparatus 1500 may be divided into more modules. The processor 1510 is configured to perform operations according to the embodiments of the present invention described before with reference to the drawings. Specifically, for detailed operations of the processor 1510, the descriptions of FIGS. 1 to 14 may be referred to.

The memory 1520 is connected to the processor 1510 and stores an Operating System (OS), applications, program codes, data, etc. The RF module 1530, which is connected to the processor 1510, upconverts a baseband signal to an RF signal or downconverts an RF signal to a baseband signal. For this purpose, the RF module 1530 performs digital-to-analog conversion, amplification, filtering, and frequency upconversion or performs these processes reversely. The display module 1540 is connected to the processor 1510 and displays various types of information. The display module 1540 may be configured as, not limited to, a known component such as a Liquid Crystal Display (LCD), a Light Emitting Diode (LED) display, and an Organic Light Emitting Diode (OLED) display. The UI module 1550 is connected to the processor 1510 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to embodiments of the present invention, it is possible to efficiently transmit reference signals by coping with the increasing number of antenna ports in a wireless communication system based on multiple antennas.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for transmitting demodulation-reference signal (DM-RS) sequences to a terminal by a base station in a wireless communication system supporting 8 layers, the method comprising:
   grouping 8 DM-RS ports corresponding to the 8 layers into 4 antenna port groups including a first antenna port group, a second antenna port group, a third antenna port group, and a fourth antenna port group,
   wherein each of the 4 antenna port groups includes two DM-RS ports;
   mapping DM-RS sequences for the 8 layers to resource elements (REs) for the 4 antenna port groups based on a predetermined DM-RS pattern,
   wherein REs for each of the 4 antenna port groups occupy 12 REs including a plurality of two consecutive REs in a first physical resource block (PRB) pair and a plurality of two consecutive REs in a second PRB pair,
   wherein two DM-RS sequences of layers corresponding to DM-RS ports included in a same antenna port group are mapped to same REs for the same antenna port group, and the two DM-RS sequences are code division multiplexed (CDM) based on an orthogonal cover code (OCC) having a length of 2; and
   transmitting DM-RS sequences for the 8 layers to the terminal through the 8 DM-RS ports,
   wherein the predetermined DM-RS pattern is defined such that the first antenna port group occupies $1^{st}$ and $11^{th}$ subcarriers of a first slot of the first PRB pair and a second slot of the second PRB pair, and $6^{th}$ subcarriers of a second slot of the first PRB pair and a first slot of the second PRB pair,
   the second antenna port group occupies $6^{th}$ subcarriers of the first slot of the first PRB pair and the second slot of the second PRB pair, $1^{st}$ and $11^{th}$ subcarriers of the second slot of the first PRB pair and the first slot of the second PRB pair,
   the third antenna port group occupies $2^{nd}$ and $12^{th}$ subcarriers of the first slot of the first PRB pair and the second slot of the second PRB pair, and $7^{th}$ subcarriers of the second slot of the first PRB pair and the first slot of the second PRB pair, and
   the fourth antenna port group occupies $7^{th}$ subcarriers of the first slot of the first PRB pair and the second slot of the second PRB pair, $2^{nd}$ and $12^{th}$ subcarriers of the second slot of the first PRB pair and the first slot of the second PRB pair.

2. The method according to claim 1, wherein the DM-RS sequences for the 8 layers transmitted through 8 DM-RS ports are generated based on a same scrambling identifier.

3. A transmitter in a wireless communication system, comprising:
   a wireless communication module configured to communicate a signal with a receiver; and
   a processor, coupled to the communication module, configured to:
   group 8 DM-RS ports corresponding to the 8 layers into 4 antenna port groups including a first antenna port group, a second antenna port group, a third antenna port group, and a fourth antenna port group,
   wherein each of the 4 antenna port groups includes two DM-RS ports;
   map DM-RS sequences for the 8 layers to resource elements (REs) for the 4 antenna port groups based on a predetermined DM-RS pattern,
   wherein REs for each of the 4 antenna port groups occupy 12 REs including a plurality of two consecutive REs in a first physical resource block (PRB) pair and a plurality of two consecutive REs in a second PRB pair,
   wherein two DM-RS sequences of layers corresponding to DM-RS ports included in a same antenna port group are mapped to same REs for the same antenna port group, and the two DM-RS sequences are code division multiplexed (CDM) based on an orthogonal cover code (OCC) having a length of 2; and
   control the communication module to transmit the DM-RS sequences for the 8 layers to the receiver through the 8 DM-RS ports, wherein the predetermined DM-RS pattern is defined such that the first antenna port group occupies $1^{st}$ and $11^{th}$ subcarriers of a first slot of the first PRB pair and a second slot of the second PRB pair, and $6^{th}$ subcarriers of a second slot of the first PRB pair and a first slot of the second PRB pair, the second antenna port group occupies $6^{th}$ subcarriers of the first slot of the first PRB pair and the second slot of the second PRB pair, $1^{st}$ and $11^{th}$ subcarriers of the second slot of the first PRB pair and the first slot of the second PRB pair, the third antenna port group occupies $2^{nd}$ and $12^{th}$ subcarriers of the first slot of the first PRB pair and the second slot of the second PRB pair, and $7^{th}$ subcarriers of the second slot of the first PRB pair and the first slot of the second PRB pair, and the fourth antenna port group occupies $7^{th}$ subcarriers of the first slot of the first PRB pair and the second slot of the second PRB pair, $2^{nd}$ and $12^{th}$ subcarriers of the second slot of the first PRB pair and the first slot of the second PRB pair.

4. The transmitter according to claim 3, wherein the DM-RS sequences for the 8 layers transmitted through 8 DM-RS ports are generated based on a same scrambling identifier.

* * * * *